Figure 1:
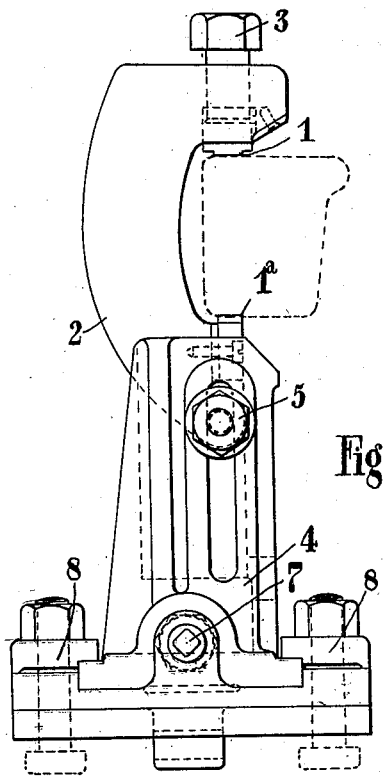

C. D. ANDREW,
DRIVING CHUCK FOR RAILWAY WHEEL LATHES.
APPLICATION FILED AUG. 23, 1920.

1,370,010.

Patented Mar. 1, 1921.

2 SHEETS—SHEET 1.

INVENTOR
C. D. Andrew,
BY H. R. Kerslake
ATTORNEY

C. D. ANDREW.
DRIVING CHUCK FOR RAILWAY WHEEL LATHES.
APPLICATION FILED AUG. 23, 1920.

1,370,010.

Patented Mar. 1, 1921.
2 SHEETS—SHEET 2.

INVENTOR
C. D. Andrew,
BY H. R. Kerslake.
ATTORNEY

UNITED STATES PATENT OFFICE.

CECIL DANIEL ANDREW, OF MANCHESTER, ENGLAND, ASSIGNOR TO SIR W. G. ARMSTRONG WHITWORTH AND COMPANY, LIMITED, OF NEWCASTLE-UPON-TYNE, ENGLAND.

DRIVING-CHUCK FOR RAILWAY-WHEEL LATHES.

1,370,010.   Specification of Letters Patent.   Patented Mar. 1, 1921.

Application filed August 23, 1920. Serial No. 405,464.

*To all whom it may concern:*

Be it known that I, CECIL DANIEL ANDREW, a subject of the King of Great Britain and Ireland, and residing at 72 Bury Old Road, Manchester, in the county of Lancaster, England, have invented certain new and useful Improvements in and Relating to Driving-Chucks for Railway-Wheel Lathes, of which the following is a specification.

This invention relates to driving dogs or chucks for railway wheel lathes and the like, and has for object to provide means whereby spoked railway and like wheels may be chucked and driven in such manner that the wheel shall not be distorted or sprung out of its true relation with the axle while being turned.

According to the invention the wheel is held in position by a plurality of driving dogs, each of which is adapted to grip the wheel rim or alternatively the tire mounted on the wheel center, at points situated on opposite faces of the rim or tire and substantially in line one with the other, in such a manner that the gripping pressure on one side of the wheel rim or tire shall automatically balance the gripping pressure upon the opposite side thereof.

Thus, in accordance with the invention, a plurality of driving dogs in the form of cramps or clamps having oppositely disposed jaws are employed for gripping the rim or tire in the manner specified, said cramps or clamps being secured to the face plate of the lathe by brackets.

For example, each of the cramps or clamps may be secured to a driving bracket arranged on the face plate (which bracket is conveniently arranged so as to be capable of movement tangentially thereto) by means of a locking bolt which passes through a slot in the driving bracket and through the cramp or clamp and forms the pivoting point therefor.

These slots are provided first for the purpose of carrying the pivoting point of the cramp or clamp as far back as possible, when engaging or disengaging the latter so as to give clearance for the link connecting the jaws of the cramp or clamp to be swung between the spokes of wheels of small diameter and secondly in order to allow the clamp when disengaged from the work to hang vertically and perfectly free therefrom, thus facilitating the removal of the work from the lathe.

The invention also comprises the provision of means whereby locomotive driving wheels and the like which are provided with balance weights may be secured to the face plate of the lathe by cramps or clamps in the manner above described and may also be supported, as it is advisable that they should be, where the space between the spokes is filled by the balance weight.

According to the invention, one or more plain gripping dogs are substituted for the clamps above described for supporting the wheel at such points, said dogs being associated with means whereby they may be moved in a direction away from the face plate to cause these plain gripping dogs to bear against the adjacent face of the wheel center or tire.

As means for causing these plain gripping dogs to bear against the adjacent face of the wheel center or tire, jack-screws may be employed, one end of the jack-screw being arranged to bear against the face plate and the other end being engaged in a screw-threaded aperture in the dog, a slot being provided in the bracket for facilitating the operation of the jack-screw for the purpose of adjusting the position of the dog in relation to the face of the wheel center or rim.

No novelty is claimed in connection with the use of these plain gripping dogs and jack-screws (which are already employed in practice) except in so far as they are employed in combination with the cramps or clamps which form the subject of the invention as hereinbefore described.

When the invention is made use of in connection with a wheel provided with balance weights, two dogs in the form of clamps secured to brackets on the face plate are first caused to engage the wheel rim by passing the free ends of these clamps between the open spaces between adjacent spokes and then the plain gripping dogs are adjusted to assist in driving the wheel and steadying the work.

Ordinarily four driving dogs will be provided on each face plate of the lathe.

The invention is illustrated by way of example in the accompanying drawings, in which:—

Figures 4, 5:
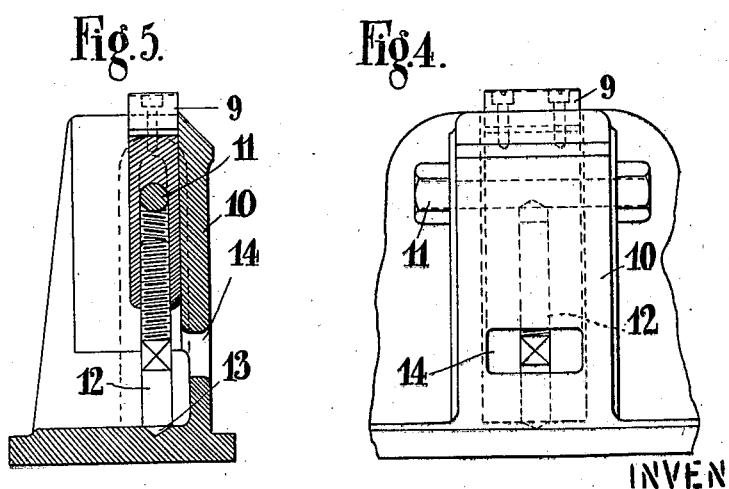
Figure 2:
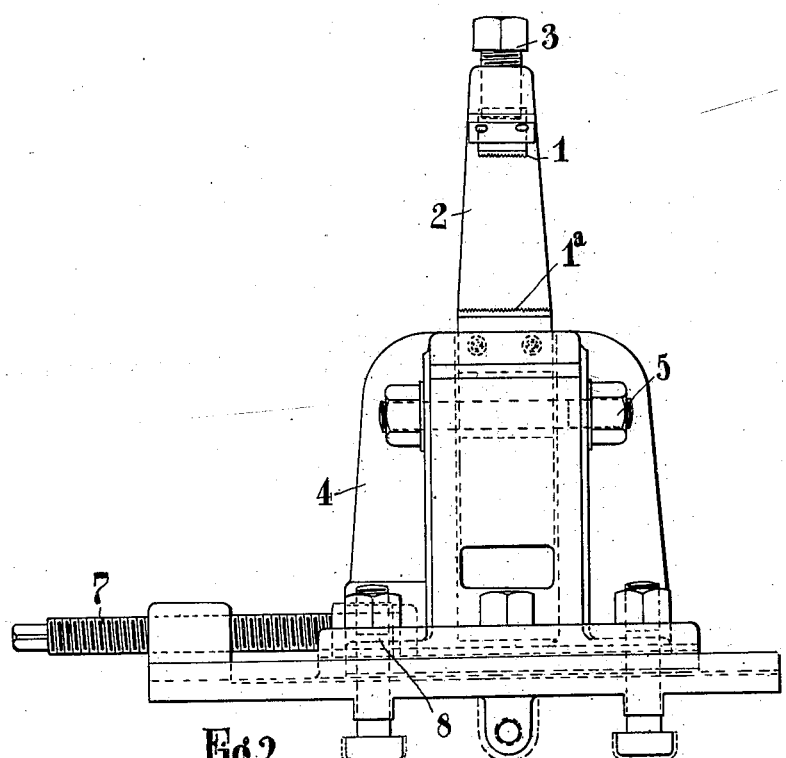
Figure 3:
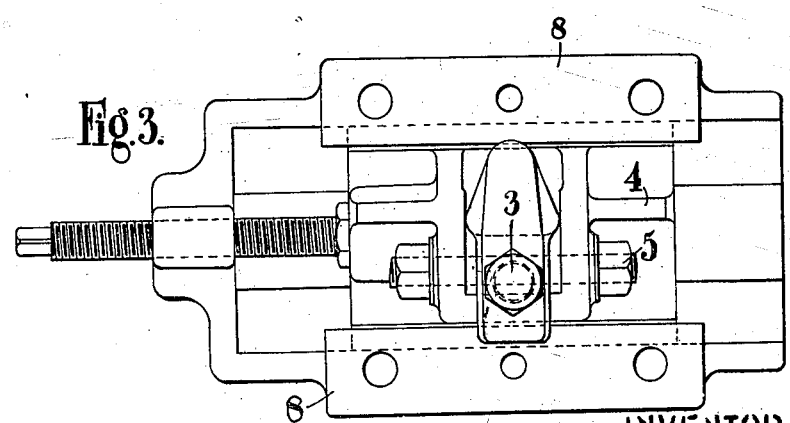

Figures 1, 2, and 3 are views in three different planes of a driving dog in the form of a cramp or clamp, and Figs. 4 and 5 are views, the latter in section, of a plain gripping dog for supporting the wheel at a point adjacent to the balance weight.

Referring to Figs. 1 to 3, 1, 1ª are the jaws of the cramp, 2 the body thereof, 3 the screw for use in adjusting the position of the movable jaw in order to grip the wheel which is being operated upon, 4 the driving bracket by which the cramp is secured to the face plate, 5 is the locking bolt which passes through a slot 6 in the driving bracket and through the cramp or clamp and forms the pivoting point therefor, 7 is a screw adapted to traverse the bracket in the guides 8 secured to the face plate and thus to cause the bracket to move tangentially to the latter.

Referring to Figs. 4 and 5, 9 is the gripping dog which is secured in the bracket 10 by means of the bolt 11, 12 being a jack-screw, one end of which is arranged to bear against the face plate at 13, and the other end being engaged in a screw-threaded aperture in the dog, the slot 14 being provided for facilitating the operation of the jack-screw for the purpose of adjusting the position of the dog in relation to the face of the wheel center or rim.

The invention provides a practical and simple means of overcoming a difficulty, which up to now has been inherent in all wheel lathes having rigid connection between the face plate and the work, as no means has been provided up to the present to secure rigid attachment of the work to the face plate of the lathe, and at the same time to eliminate all tendency of distortion of the work.

Having now described my invention what I claim as new and desire to secure by Letters Patent is:—

1. In a railway wheel lathe, a bracket provided with means for securing the same to the face plate of the lathe and having slotted portions, a yoke-shaped clamp, a pivot pin extending through the clamp and through the slotted portions of the bracket, means for securing said pivot pin in various positions in said slots, a stationary jaw fixed to the yoke-shaped member, and a movable jaw carried by the yoke-shaped member and coöperating with the stationary jaw for clamping a portion of a railway wheel between the jaws.

2. In a lathe of the kind defined by claim 1, the provision of a recess in said bracket designed to receive the yoke-shaped member and of sufficient size to permit the yoke-shaped member to be swung entirely clear of the wheel being operated upon.

3. A lathe of the kind defined by claim 1 in which the bracket is of substantially U-shaped cross-section to provide a recess of sufficient depth to receive the major portion of the yoke-shaped member and to permit the yoke-shaped member to be swung clear of the wheel being operated upon.

4. In a railway wheel lathe, a bracket adapted to be secured to the face-plate of the lathe, a unitary clamp pivotally mounted on said bracket and provided with a stationary jaw, a jaw movable toward and away from the stationary jaw, and means for adjusting the bracket in a plane substantially at right angles to the plane of movement of the clamp about its pivot pin.

5. A lathe of the kind defined by claim 1 having a guide member in which the bracket is slidably mounted, and means for adjusting the bracket in the guide member in a plane substantially at right angles to the plane of movement of the yoke-shaped member.

In testimony whereof I have signed my name to this specification.

CECIL DANIEL ANDREW.